United States Patent [19]
Bilkadi et al.

[11] Patent Number: 4,906,523
[45] Date of Patent: Mar. 6, 1990

[54] PRIMER FOR SURFACES CONTAINING INORGANIC OXIDE

[75] Inventors: Zayn Bilkadi, Mahtomedi, Minn.; Harald Guder, Wuppertal, Fed. Rep. of Germany

[73] Assignee: Minnesota Mining and Manufacturing Company, St. Paul, Minn.

[21] Appl. No.: 100,604

[22] Filed: Sep. 24, 1987

[51] Int. Cl.$^4$ .................. B05D 1/36; B32B 13/12; B32B 33/00; C08K 5/05

[52] U.S. Cl. ......................................... 428/327; 404/9; 404/12; 404/94; 428/328; 428/329; 428/331; 428/428; 428/448; 428/451

[58] Field of Search ............... 524/407, 413, 364, 365, 524/493, 497; 428/451, 328, 327, 331, 428, 448, 329; 404/12, 94, 9

[56] References Cited

U.S. PATENT DOCUMENTS 2,692,863 10/1954 Iler ........................................ 252/309
2,801,185 7/1957 Iler ........................................ 106/288
3,718,584 2/1973 Beste et al. ............................ 524/497
3,917,554 11/1975 Inoue et al. ............................ 524/364

FOREIGN PATENT DOCUMENTS 57-25371 7/1980 Japan .

OTHER PUBLICATIONS

J57025371/22630 Derwent Abstract (one page) describes a priming composition for concrete which comprise an aqueous suspension of synthetic resin or synthetic rubber.

Primary Examiner—James C. Cannon
Attorney, Agent, or Firm—Donald M. Sell; Walter N. Kirn; Mark A. Litman

[57] ABSTRACT

A composition that is a primer or adhesive for adherence of overcoating functional layers to inorganic oxide-containing substrate, particularly silicon oxide-containing substrates is described. The composition is particularly useful for the adherence of a pavement marking tape to a pavement.

20 Claims, No Drawings

PRIMER FOR SURFACES CONTAINING INORGANIC OXIDE

FIELD OF THE INVENTION

This invention relates to a composition that is a primer or adhesive for inorganic substrates. In another aspect, it relates to a composite structure comprising, in sequence, a first member inorganic substrate, a second member primer layer, and a third member selected from a functional layer or a second inorganic substrate. In a further aspect, it relates to a method for making the composite structure.

BACKGROUND OF THE ART

Primer compositions that promote the adhesion of overcoatings onto substrates are known in the art. They are particularly useful in articles requiring the bonding of organic materials to inorganic substrates. The resulting adhesion of the overcoating, however, is frequently less than is necessary for the desired use.

Silica organosols have been added to organic polymer type protective coatings to strengthen and improve the adhesion of the coating to a substrate. For this purpose, U.S. Pat. No. 2,692,867 discloses the use of silica organosols of silica particles having absorbed on their surface a long hydrocarbon chain substituted ammonium ion and U.S. Pat. No. 2,801,185 discloses the use of silica particles having a coating of any substance reactive with the silica surface, preferably an alcohol. The use of such a composition is described only as the exposed coating itself and is not disclosed as a primer.

Antireflective coatings of inorganic oxides on optical articles are described in Assignees copending patent applications U.S. Ser. No. 035,272 filed Apr. 2, 1987 and U.S. Ser. No. 910,250 filed Sept. 19, 1986. Coating compositions comprising a sol of a metal oxide and optionally a binder resin are disclosed. The use of these compositions as a primer is not disclosed.

Assignees copending application U.S. Ser. No. 40930 filed Apr. 21, 1987 describes the use of sol coating of inorganic oxides on polymeric substrates as subbing layers (primer layers) for photographic hydrophilic colloid silver halide emulsions.

There is disclosed in Japan Kokai Tokkyo Koho JP 82 25, 371 (Chem. Abstracts 97, 74008h (1982)) the use as a primer for concrete substrates of a composition of emulsions of synthetic polymers or synthetic rubbers and colloidal silica. Such a primer composition is slow drying and not at all suitable for modern construction where speed of application and readiness for placement of a top layer is important as is the situation in much housing development and highway marking.

The prior art, thus, does not teach a composition suitable for the rapid promotion of adhesion of a polymeric coating, e.g., paints, lacquers, tapes and the like onto inorganic surfaces, e.g., concrete, ceramics, porcelain, glass, bricks, stone, metal and the like or the adhesion of one inorganic substrate to another inorganic substrate.

BRIEF DESCRIPTION OF THE INVENTION

The present invention provides a composition that is a primer or adhesive (herein called "primer/adhesive") for the adherence of layers to metal oxide-containing substrates particularly silicon oxide-containing substrates and for the adherence of one metal oxide-containing substrate to another metal oxide-containing substrate. The invention particularly provides a primer/adhesive for adherence of overcoating functional layers or metal oxide-containing substrates to metal oxide-containing substrates. The primer/adhesive composition of the invention comprises a colloidal dispersion of:

1. one or more thermoplastic elastomers that are soluble in at least one proton accepting solvent,
2. one or more colloidal inorganic oxides, particularly silicon dioxide, present as an organosol, and
3. a volatile solvent mixture comprising
    (a) one or more organic proton accepting solvents preferably having a boiling point of 100° C. or less at atmospheric pressure, and
    (b) one or more organic, hydroxy group-containing solvents, preferably having a boiling point of 125° C. or less at atmospheric pressure.

The present invention also provides a composite structure comprising:

1. A first layer comprising a metal oxide-containing substrate, e.g., a highway, street, or path of hydraulic or asphaltic concrete, a concrete block wall; masonry materials including bricks, plaster, mortar, stucco, and stone; ceramics including first clay products, whitewares, enamels, refractories, porcelain, glass or tile,
2. an intermediate or second layer of the primer/adhesive described above, and
3. a third layer, usually having a specific functional objective, such as a protective coating, an abrasion resistant coating, a marking layer, a decorative layer, a lubricant layer and the like or another metal oxide-containing substrate.

By the term "metal oxide-containing substrate" is meant a substrate that comprises one or more metal oxides, i.e., silicon dioxide, calcium oxide, and aluminum oxide, that may also contain one or more of other elements present as an oxide including, for example, hydrogen, calcium, magnesium, barium, iron, nickel, beryllium, tin, titanium, copper and zirconium.

By the term "thermoplastic elastomer soluble in proton accepting solvents" is meant an elastomer, e.g., a polymer than can be stretched by tension within its limits of elastic deformation and on release of tension recovers at least about 90 percent of its original dimensions, that is soluble in a proton accepting solvent.

By the term "proton accepting solvent" is meant an organic compound having an electron configuration such that it will accept the hydrogen of a proton donating compound. The proton accepting solvent of use in the invention preferably has a boiling point below 100° C., as for example, acetone, ethyl acetate, acetonitrile, and tetrahydrofuran.

The composition of the invention is excellently suitable for use in bonding traffic control stripes to highway and street surfaces, e.g., to its use with pavement-marking sheet materials. The composition can be applied to the pavement even under conditions when the pavement is wet. The elastomer-sol composition evidently bonds because much of the water present is carried off by the evaporating solvent. High strength bonding of the composition apparently is obtained because of the formation of bonds between the inorganic metal oxide, especially silica, in the pavement material, and the inorganic metal oxide in the sol of the elastomer-sol composition where a network of metal oxide particles forms on disappearance of the hydroxyl group-containing solvent which had stabilized the dispersion of metal oxide sol in the composition.

DETAILED DESCRIPTION OF THE INVENTION

The primer or adhesive composition of the invention provides for the adherence of overcoating functional layers to metal oxide containing substrates such as concrete including both hydraulic concrete and asphaltic concrete; masonry materials including cement block, bricks, plaster, mortar, stucco, stone; ceramics including fired clay products, whitewares, enamels, refractories, porcelain, glass, and tile; and metals, for example, steel, aluminum and copper. The substrates comprise, in common, one or more metal oxides such as silicon dioxide, aluminum oxide, zirconium oxide, calcium oxide, and iron oxide and can also contain one or more of the oxides and ions of any of the elements listed in the Periodic Table of Elements. The metal oxide-containing substrate can furthermore contain materials that are not metal oxides such as organic polymers, e.g., asphaltic materials, fibers, flakes, graphite or metal wires, and rods that are added to the substrate for structural reinforcement or modification of characteristics of the substrate.

The thermoplastic elastomer of use in the primer/adhesive composition of the invention is one that is soluble at least to 10%, preferably at least to 20%, by weight in a proton accepting solvent (e.g., acetone) and does not swell in petroleum solvents nor absorb more than about 5 percent by weight of such petroleum solvents (e.g., hexane). Examples of such elastomers including but are not limited to polyester-polyurethanes, polyether-polyurethanes, homopolymers and copolymers of acrylate esters such as poly(ethyl acrylate) and poly(ethyl acrylate-ethylene), nitrile rubbers such as poly(butadiene-acrylonitrile), chlorosulfonated polyolefins, and fluorocarbon elastomers. The polyurethanes are preferred because of their toughness and oil resistance and the polyacrylates are preferred because of their stability in sunlight, resistance to oil, and enhanced hydrolytic stability. Examples of polyester-polyurethanes are the Estane TM resins of B.F. Goodrich Chemical Co. such as 5703, 58013, and 58092, the Orthane TM resins of Ohio Rubber such as 13480, the resins of K.J. Quinn Co. such as PC-72 TM and the Hytrel TM resins of E.I. duPont such as 6345 and 7246. Examples of polyether-polyurethanes are Estane TM 58600 and 58610 of B.F. Goodrich Chemical Co. and PR-36 and PE-90 of K.J. Quinn Co. Examples of nitrile rubbers are B.F. Goodrich's acrylontrile-butadiene resins such as Hycar TM 1022 and Vamac TM, an ethylene-acrylic resin. Examples of fluorocarbonelastomers are 3M's Fluorel TM such as 2176.

Colloidal inorganic oxides utilized in the present invention are finely divided metal oxide particles having a particle size of less than about 400 Angstroms preferably less than 250 Angstroms, that are dispersed or suspended in water or an organic solvent. Generally such dispersions or suspensions are termed hydrosols when suspended in water and orgonosols when suspended in an organic solvent. Preferred colloidal inorganic oxides are the oxides of silicon, aluminum, zirconium, chromium, and titanium of which the most preferred are the oxides of silicon.

Commercially available dispersions of metal oxides include "Dispural" and "Pural" boehmite ($Al_2O_3.H_2O$) available from Condea Petrochemie (GmbH: "Catapal" SB boehmite available from Vista Chemical Co.; "Nalco" ISJ-614 alumina sol, "Nalco" ISJ-613 alumina coated silica sol, "Nalco" 2326, "Nalco" 1034A, "Nalco" 1034A, "Nalco" 1129, and "Nalco" 8455-258 silica sols available from Nalco Chemical Co.; and "Ludox" LS silica sol available from E.I. duPont.

Proton accepting solvents useful in the compositions of the invention are those having a boiling point of 100° C. or lower, preferably of about 50 to 80° C. Examples of such solvents are ketones, nitriles, esters, and ethers such as acetone, acetonitrile, isobutyronitrile, diethyl ketone, methyl ethyl ketone, methyl n-propyl ketone, nitromethane, propionitrile, dimethoxyethane, ethyl acetate, ethyl propionate, methyl acetate, tetrahydrofuran and tetrahydroxyan. Preferred proton accepting solvents are acetone, methyl ethyl ketone, and methyl t-butyl ether.

Hydroxy group-containing solvents useful in the composition of the invention are selected from water and alkanols that boil below about 125° C. Examples of alkanols include methanol, ethanol, propanol, isopropanol, 2-ethoxyethanol, and 2-propoxyethanol.

The priming/adhesive composition of the invention is prepared by mixing or blending the organic sol with one or more thermoplastic elastomers in a mixture of one or more proton accepting solvents and one or more organic hydroxy group-containing solvents. The materials may be mixed in any order. Generally, the inorganic sol is present as a dispersion in a hydroxyl group-containing organic solvent, having been prepared or purchased in such a solvent, preferably at a concentration of from about 10 to about 35 percent by weight. The dispersion is mixed into a solution of the thermoplastic elastomer in one or more organic proton accepting solvents that have a boiling point, preferably of 100° C. or less at atmospheric pressure and that is at a concentration of about 10 to 20 percent by weight of total solution. Relative amounts of sol dispersions and elastomer solutions are chosen and additional solvents added or removed, as by volatilization, so that the resulting primer/adhesive composition preferably contains from about 0.5 to 10 parts of elastomer per part of colloidal inorganic oxide, from about 1 part to 10 parts of hydroxy group-containing solvent per part of colloidal inorganic oxide, and from about 5 to 30 parts of proton accepting solvent per part of elastomer. Water can also be present in the composition in an amount less than the amount which brings about the precipitation of elastomer from the composition. Preferably, the composition contains 2.5 to 5 parts of elastomer per part of colloidal inorganic oxide when the elastomer is an acrylic resin and about 1.0 to 2.5 parts of elastomer per part of colloidal inorganic oxide when the elastomer is a urethane rubber. These proportions with respect to 0.8 parts of colloidal inorganic oxide are preferred.

The primer/adhesive composition of the invention even when containing up to two parts of colloidal inorganic oxide remains clear for prolonged periods of time and does not form precipitates as do paints and varnishes containing larger inorganic oxide particles such as fumed silica. The compositions furthermore dry to optically clear films when pigments, dyes, or other optical density-providing additives are absent.

The following specific, but non-limiting examples will serve to illustrate the invention. In these examples, all percentages and parts are by weight unless otherwise indicated.

EXAMPLE 1

Preparation of primer/adhesive composition. Into a 150 ml. bottle was placed 20 g. of a 20% by weight solution of polyurethane elastomer in acetone (Estane TM 5703 obtained from B.F. Goodrich) and 46.7 g. of acetone and the mixture was shaken well on a vibratory shaker. There was then added dropwise 13.3 g. of a 30% by weight silica sol (Nalco TM 1129 obtained from Nalco Chemical Co.) in 40/30 isopropanol/water while shaking the mixture. A clear solution having 10% by weight solids was obtained. The solution remained clear on prolonged standing. The solution contained 1 part of urethane elastomer, 1.3 parts of isopropanol per part per weight of colloidal silica, and 1 part of water and 19.6 parts of acetone per part of urethane elastomer.

In a cold room (at about 4° C.) the primer/adhesive was applied to a concrete block by two passes with a paint brush and allowed to dry for five minutes. Pavement marking tape ("Stamark" Brand 5710 Detour Grade) in 10 cm. wide strips was applied to the primed block using a five pound roller. The force required to peel the tape from the block was about twice the force required to peel the tape from an unprimed block. The concrete surface from which the tape was pulled remained clean and unmarked by elastomer or adhesive from the tape. It has been found that somewhat lower concentrations of colloidal silica are preferred over that shown in this Example to improve resistance to environmental wear.

EXAMPLE 2

The procedure for Example 1 was repeated using only 33.4 g. instead of 46.7 g. acetone and 6.65 g. instead of 13.3 g. of silica sol. A clear solution having 10% by weight solids was obtained that remained clear on prolonged standing. Per part by weight of colloidal silica, there was 2 parts of urethane elastomer, 1.3 parts of isopropanol, and 1 part of water. There was 12.3 parts of acetone per part of urethane resin.

Pavement marking tape applied to concrete as described in Example 1 that had been primed with the primer required a force of about twice that to peel the tape from an unprimed block. Following removal of the tape, the underlying surface was clean and unmarked by elastomer or adhesive from the tape.

EXAMPLE 3

The procedure of Example 1 was repeated using 40 g. of a 20% by weight solution of polyurethane elastomer, 53.3 g. of acetone, and 6.7 g. of 30% silica sol. A clear solution, 10% by weight in solids, was obtained that remained clear on prolonged standing. The solution contained per part by weight of colloidal silica 4 parts of urethane rubber, 1.3 parts of isopropanol, and 1 part of water. These were 10.7 parts of acetone per part of urethane elastomer.

Similar peel results were obtained as in Examples 1 and 2.

EXAMPLE 4

Into 80 parts of acetone was dissolved 20 parts of a 41% acrylonitrile—59% butadiene copolymer (Hycar TM 1022 available from B.F. Goodrich). Following the procedure of Example 1, to 20 g. of this solution was added 60 g. acetone and 13.3 g. of 30% by weight silica sol using vigorous shaking to break up lumps which initially formed. A translucent solution having 8.5% solids was obtained that contained per part of colloidal silica, one part of acrylic elastomer, 1.3 parts of isopropanol, and 1 part of water. There were 21 parts of acetone per part of acrylic rubber.

The primer was applied to concrete as described in Example 1. It dried within 5 minutes to a clear transparent film which was extremely aggressive toward a pavement marking article comprising a bulk material of a polyethylene/acrylonitrile rubber with pigments and fillers and an adhesive of polybutadiene rubber (the article hereinafter referred to as the "standard" pavement marking).

EXAMPLE 5

Into a 150 ml. bottle was placed 20 g. of a 20% by weight solution of 41% acrylonitrile-59% butadiene copolymer in methyl ethyl ketone and 46.7 g. of methyl ethyl ketone. The mixture was shaken well on a vibratory mixer. There was then added dropwise, while shaking the mixture, 1.3 g. of a 30% by weight silica colloid in 2-propoxyethanol (Nalco TM 84SS-258 obtained from Nalco Chemical Co.). The resulting solution, containing 10% solids, was water clear and remained so on prolonged standing. Upon coating this dispersion onto concrete blocks in a cold room as described in Example 1, clear films were obtained which firmly bonded to the standard pavement marking tape.

EXAMPLE 6

Into a 150 ml. bottle was placed 100 g. of a 20% by weight Vamac ®. (duPont's ethylene-methyl acrylate-copolymer) in acetone. 126.7 g. of acetone were added and the mixture shaken well on a vibratory mixer. 13.3 g. of a 30% by weight silica colloid in 40/30 isopropanol/water solvent were added slowly to the shaken mixture and with continued mixing. The resulting dispersion was clear, containing 10% solids. When coated on concrete in a cold room, it dried within 5 minutes and adhered very well to the block and aggressively formed a bond with standard pavement marking tape.

EXAMPLE 7

In a 500 ml. flask was mixed 100 g. of a 20% by weight Vamac ® elastomer in acetone with 233.3 g. acetone. After thorough mixing on a vibratory shaker was added 66.7 g of a 30% by weight silica sol dispersed in 2-propoxyethanol. The solution was clear and when applied to a concrete block at 4° C. as in Example 1, a clear film was obtained. The film adhered very well to concrete and appeared to dry within 8 minutes of application. The film formed an aggressive bond with standard pavement marking tape.

EXAMPLE 8

In a 1000 ml. flask was mixed 100 g. of Vamac ® weight % with 411.3 of acetone. After thorough mixing 133.4 g. of 30% colloidal silica (Nalco 8455-258) in 2-propoxyethanol was added slowly. The resulting dispersion was clear. It was coated on concrete blocks at 4° C. as in Example 1. The film was substantially dry after 8 minutes. It adhered tenaciously to the concrete block. The film formed a strong bond with standard pavement marking tape.

What is claimed is:

1. A composite structure comprising a metal oxide-containing substrate, a dried intermediate layer formed from a primer/adhesive composition comprising (a) at least one thermoplastic elastomer that is soluble in proton accepting solvents,
(b) at least one colloidal inorganic oxide, and
(c) a solvent mixture comprising
   (1) at least one proton-accepting solvent, and
   (2) at least one hydroxyl group-containing solvent, and a layer overlaying and bonded to the intermediate layer.

2. The composite structure of claim 1 wherein the colloidal inorganic oxide is colloidal oxide of silicon, chromium, titanium or zirconium.

3. The composite structure of claim 1, wherein the colloidal inorganic oxide is a colloidal oxide of silicon having a particle size of less than 400Å.

4. The composite structure of claim 3 wherein the substrate is a concrete-containing roadway.

5. The composite structure of claim 1 wherein said solvent mixture comprises from 1.0 to 10 parts of hydroxy group-containing solvent and from 5 to 30 parts of proton accepting solvent per part of thermoplastic elastomer.

6. The composite structure composition of claim 1 wherein said at least one proton accepting solvent has a boiling point of 100° C. or less at standard atmospheric pressure.

7. The composite structure of claim 1 wherein said hydroxyl group-containing solvent has a boiling point of 125° C. or less at standard atmospheric pressure.

8. The composite structure of claim 1 wherein said inorganic oxide is selected from the group consisting of silica, alumina, chromia, titania, and zirconia.

9. The composition of claim 1 wherein said hydroxyl group-containing solvent has a boiling point of 125° C. or less at standard atmospheric pressure.

10. The composite structure of claim 1 in which said layer overlaying and bonded to the intermediate layer is a pavement marking tape.

11. A composite structure comprising a silicon dioxide-containing substrate, an intermediate layer of the dried product of a composition comprising
   (a) at least one thermoplastic elastomer that is soluble in proton accepting solvents,
   (b) at least one colloidal inorganic oxide, and
   (c) a solvent mixture comprising
      (1) at least one proton accepting solvent, and
      (2) at least one hydroxyl group-containing solvent, and a layer overlaying and bonded to the intermediate layer.

12. The composite structure of claim 11 in which said layer overlaying and bonded to the intermediate layer is a pavement marking tape.

13. The composite structure of claim 11 wherein the substrate is a concrete-containing roadway.

14. The composite structure of claim 13 in which said layer overlaying and bonded to the intermediate layer is a pavement marking tape.

15. The composite structure of claim 11 wherein said colloidal inorganic oxide is selected from the group consisting of silica, alumina, chromia, titania, and zirconia.

16. The composite structure of claim 15 in which said layer overlaying and bonded to the intermediate layer is a pavement marking tape.

17. A composite structure comprising a metal oxide-containing substrate, an intermediate layer comprising the dried product of a composition comprising one part by weight of at least one particulate inorganic oxide having average particle sizes of less than 400 Angstroms of
   (a) from 0.5 to 10 parts of at least one thermoplastic elastomer which is soluble in a proton accepting solvent, and
   (b) a solvent mixture comprising at least one proton accepting solvent and at least one hydroxyl group-containing solvent, and a layer overlaying and bonded to the intermediate layer.

18. The composite structure of claim 17 wherein said at least one proton accepting solvent has a boiling point of 100° C. or less at standard atmospheric pressure.

19. The composite structure of claim 17 wherein said layer overlaying and bonded to the intermediate layer is selected from the class consisting of a protective coating, a marking layer, and a decorative layer.

20. The composite structure of claim 16 in which said layer overlaying and bonded to the intermediate layer is a pavement marking tape.

* * * * *